United States Patent [19]
Fujiwara

[11] 3,856,035
[45] Dec. 24, 1974

[54] LIQUID LEVEL CONTROL VALVE

[76] Inventor: Katsuji Fujiwara, 191, Nishitani, Hiraoka-cho, Kakogawa-shi, Hyogo-ken, Japan

[22] Filed: Nov. 19, 1973

[21] Appl. No.: 416,788

[30] Foreign Application Priority Data
Dec. 20, 1972  Japan............................. 47-146484

[52] U.S. Cl.................. 137/413, 137/433, 137/444, 251/38
[51] Int. Cl........................................... F16k 31/22
[58] Field of Search........... 137/403, 412, 413, 414, 137/415, 426, 429, 430, 433, 434, 442, 443, 137/444, 450; 251/38; 261/70

[56] References Cited
UNITED STATES PATENTS

| | | | |
|---|---|---|---|
| 974,925 | 11/1910 | Schulte............................ | 251/38 X |
| 1,273,021 | 7/1918 | Zahm................................ | 137/433 |
| 2,752,936 | 7/1956 | Cantalupo....................... | 137/442 X |
| 3,054,419 | 9/1962 | Farrell.............................. | 137/415 X |
| 3,208,471 | 9/1965 | Olsen................................ | 137/414 |

*Primary Examiner*—Martin P. Schwadron
*Assistant Examiner*—David R. Matthews
*Attorney, Agent, or Firm*—Toren, McGeady and Stanger

[57] ABSTRACT

A liquid level control valve for supplying liquid into a tank in such a manner that the liquid within the tank is maintained at a predetermined level at all times. A sealing member is provided having a piston actuated by pressure change within a pressure chamber which is in communication with a liquid source through a first orifice and with the interior of the tank through a second orifice. The second orifice is larger than the first orifice and is opened and closed by a float which is displaceable in a free state according to the liquid level of the tank.

7 Claims, 1 Drawing Figure

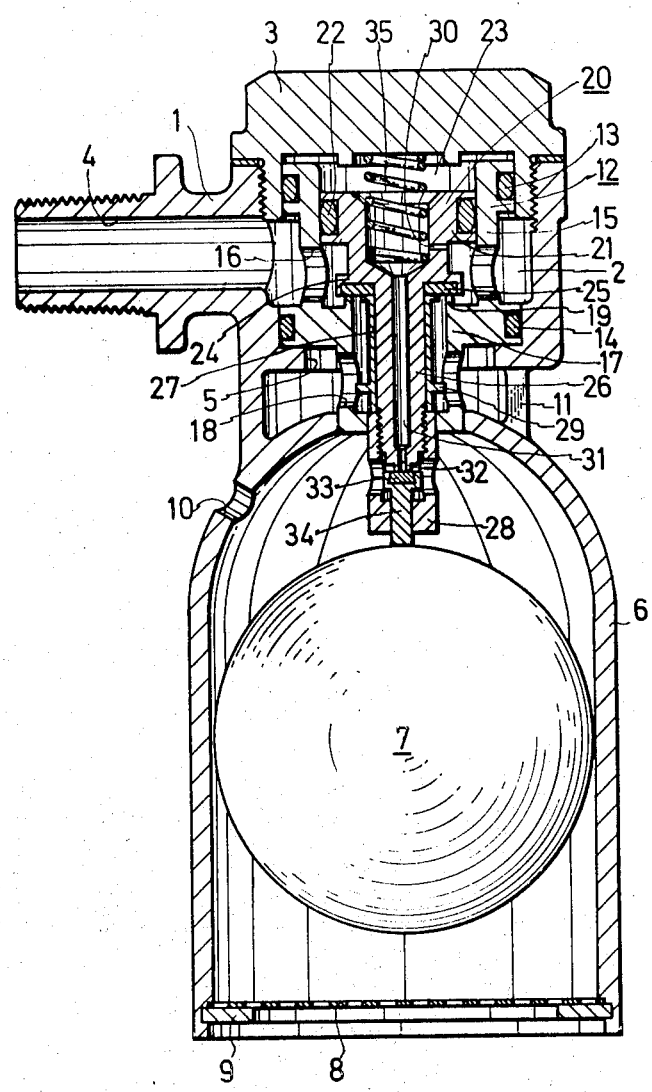

LIQUID LEVEL CONTROL VALVE

BACKGROUND OF THE INVENTION

The present invention relates to a liquid level control valve which controls the supply of liquid into a tank in such a manner that it maintains the liquid within the tank at a predetermined level at all times.

Liquid level control valves are usually installed within storage tanks to control supply of liquid thereto and to maintain the liquid therein at a predetermined level at all times. In the operation of such valves, the valve opens to supply liquid into the tank when the level within the tank is lower than a desired predetermined level, with the valve closing to cut off the supply of liquid when the liquid level rises to the desired predetermined level. It is, of course, required that such valves operate sensitively and with stability in a trouble-free manner and that they be inexpensive to manufacture and convenient to maintain. Further, in a case where the valve is installed within a small tank or the like, it is especially necessary for the valve to be small in size and capable of supplying large quantities of liquid for short periods of time.

This type of liquid level control valve usually converts rocking motion caused by rise and fall of a float connected with a lever, into single or double vertical or reciprocating motion by means of a crank mechanism or the like thereby to effect seating and separating of a valve from a valve seat.

In such a structure, since the closed state of the valve is maintained only by buoyancy acting on the float, it is required that the float be extremely large and that its lever be relatively long in order to rigidly maintain the closed state of such a valve which must be capable of supplying large quantities of liquid for short periods of time. Accordingly, the valve becomes quite large in its overall configuration and rather long in one direction. Thus, it cannot be installed within certain small tanks.

Further, defective operation of the valve will be caused by wear brought about due to dust adhered to such portions as the fulcrum at which rocking motion of the lever occurs and at the connecting portion of the crank mechanism.

Since the sealing element of such a valve is connected directly to the float through the lever, the valve will be actuated even if the liquid surface is disturbed slightly, and it will repeatedly open and close quite often; indeed more than is required.

Furthermore, it is difficult during manufacture to align the center of the axis of the sealing element with that of the valve seat cooperating with the sealing element, so that this type of valve will give rise to serious apprehensions regarding its ability to close completely particularly in a case where the sealing element includes two sealing portions.

Thus, it is an object of the present invention to overcome the above mentioned disadvantages and to provide a liquid level control valve which is small in size, which is capable of supplying large quantities of liquid for short periods of time, which will operate with sensitivity and stability without trouble, and which will function for long periods of time without requiring excessive maintenance.

SUMMARY OF THE INVENTION

Briefly, the present invention may be described as a liquid level control valve comprising, in combination, a housing defining a valve chamber therein, with an inflow part communicating with the valve chamber at the lower side of the valve chamber and with an annular seat provided at the bottom wall of the valve chamber encircling thereat an outflow port. A float retaining chamber is positioned beneath the outflow port and a float is retained therein in a free state. A sealing member consisting of a piston disposed within the valve chamber and arranged displaceable along the inner wall thereof at its upper part in an airtight manner forms a pressure chamber above the sealing member. A sealing element is mounted on said piston above the annular valve seat with which it cooperates, and a slender rod projecting from the piston extends into the float retaining chamber through the outflow port. The sealing member is provided with a first orifice which communicates the pressure chamber above the sealing member with the outflow port. A second orifice is positioned at the lower end of the rod which extends from above the float within the float retaining chamber to the pressure chamber above the sealing member. The second orifice is configured to be larger than the first orifice.

When, as a result of a reduced liquid level within the float retaining chamber, the float is caused to move downwardly, a valve which communicates the interior of the float retaining chamber with the pressure chamber above the sealing member will open causing a pressure drop in the pressure chamber. As a result, the sealing member rises to separate the sealing element from the annular seat thereby enabling liquid inflow. Because of the difference in size between the first and the second orifice, the valve is maintained in the open state until the desired predetermined liquid level is attained.

DESCRIPTION OF THE DRAWING

Other features and advantages of the invention will be apparent from the following detailed description taken in connection with the accompanying single FIGURE of the drawing which is a vertical view of the preferred embodiment of this invention.

DESCRIPTION OF THE PREFERRED EMBODIMENTS

In the drawing, a preferred embodiment of a valve according to the invention is shown in its closed state, with a main body 1 forming a valve chamber 2 and including a cover member 3. The valve chamber 2 is in communication with a liquid source (not shown) through an inflow port 4, and include an aperture 5 at its bottom wall.

A float retaining bell chamber 6 is secured integrally to the main body 1 under the aperture 5, and contains therein a float 7 which is freely displaceable within the chamber 6. A screen 8 is fixed to the bottom of the chamber 6 by means such as a snap ring 9, and an air vent hole 10 is provided.

The aperture 5 leads into a storage tank (not shown) through a discharge port 11 provided at the connecting portion between the main body and the bell chamber 6.

A seat member 12 is disposed within the valve chamber 2 with O-rings 13, 14 arranged for airtight sealing between the outer wall of the seat member 12 and the adjacent inner wall of the valve chamber 2. The seat member 12 is integrally formed with an upper cylinder 15 having first through holes 16 at its lower part interconnecting the interior of the upper cylinder 15 and the inflow port 4, a lower cylinder 17 having second through holes 18 interconnecting the interior of the lower cylinder 1 and the discharge port 11, and an annular seat 19 provided at a location intermediate the two cylinders 15, 17 positioned at the upper brim of the lower cylinder 17.

Further, a sealing member 20 is disposed within the seat member 12, and is integrally formed with a piston 21 at its upper portion which is enlarged radically to be slidably vertically displaceable along the inner wall of the upper cylinder 15 with an O-ring 22 forming an airtight sealing engagement therebetween. The arrangement is configured to form a pressure chamber 23 at the upper part of the valve chamber 2, with a sealing element holder 24 located at its middle portion having mounted thereon a sealing element 25 preferably made of nitrogen rubber and co-operatively positioned over the annular seat 19. A slender rod 26 projecting into the bell chamber 6 through the lower cylinder 17 is provided with a sleeve 27 therearound fixed by a pilot valve retainer 28 secured at the lower end of the rod 26. The sleeve 27 is pressed upwardly and at its upper end it engages the sealing element 25 to secure it in place. A radially enlarged plate 29 formed around the sleeve 27 transmits the impact force of liquid flowing downwardly with the outer periphery of the plate 29 being spaced apart from the inner wall of the lower cylinder 17 to enable its vertical displacement within the lower cylinder 17.

The sealing member 20 has formed therein a first orifice 30 which communicates the pressure chamber 23 with the inflow port 4 through the first through holes 16, and a passage 31 which extends through the piston 21 and the slender rod 26 and interconnects the pressure chamber 23 with the interior of the bell chamber 6 through a second orifice 32 formed at the lower end portion of the passage 31. The first orifice 30 is smaller than the second orifice 32 and thus provides a flow path of smaller cross-sectional area.

A pilot valve 33 preferably made of nitrogen rubber is mounted on a pilot valve holder 34 to cooperate with the second orifice 32.

The pilot valve holder 34 is suspended by the pilot retainer 28 and projects therethrough over the float 7 to be operatively displaced thereby.

A spring 25 preferably provided with the pressure chamber 23 biases the sealing member 20 downwardly to effect a mode of operation which will become apparent hereinafter.

In the operation of the liquid level control valve according to the invention, when the level of the liquid within the storage tank falls below the predetermined level, the float 7 as well as the pilot valve 33 and the pilot valve holder 34 will fall by the force of their dead weight, and the second orifice 32 is opened, whereby the liquid within the pressure chamber 23 flows out into the tank through the passage 31 and the second orifice 32.

Since the first orifice 30 is smaller than the second orifice 32, the pressure within the pressure chamber 23 decreases to a level lower than that of the inflow port 4. Therefore, the piston 21 and the sealing member 20 are displaced upwardly while compressing the spring 35. The sealing element 25 then separates from the annular seat 19 and a large quantity of liquid is supplied for a short time into the tank through the wide area enclosed by the annular seat 19, the second through holes 18 and the discharge port 11.

When the tank is supplied with liquid and the liquid level rises up to the predetermined level, the float 7 will rise with the liquid level due to the force of buoyancy acting on the float 7 to displace the pilot valve holder upwardly.

The pilot valve 33 is then pressed against the second orifice 32 to effect closure thereof. It will be apparent that in the mechanism of the present invention, no lever or crank mechanism is required so that trouble due to wear and rust at the fulcrum of a lever or at the connecting portion of a crank mechanism will never occur. The pressure within the pressure chamber 23 will increase up to that of the inflow port 4 through the first orifice 30. At this time, the plate 29 is subjected to the impact force of the liquid flowing downwardly. Thus, the sealing member is displaced rapidly by the downwardly urging forces, that is, the liquid pressure acting on the sealing member 20, the resilience of the spring 35 and the liquid impact force acting on the plate 29. If the pressure of the liquid source is sufficiently large, the sealing element 20 is pressed rigidly on the annular seat 19 only by the liquid pressure, so the spring 35 is not necessary.

Furthermore, in this closed condition, the interior of the bell chamber 6 is in communication with the tank through the screen 8 at the bottom of the bell 6, disturbance on the surface of the liquid within the tank is mitigated by the screen 8, and the liquid surface within the bell chamber 6 is always calm, so that the float 7 is not disturbed, and so that the second orifice 32 will be closed stably and rigidly.

While a specific embodiment of the invention has been shown and described in detail to illustrate the application of the inventive principles, it will be understood that the invention may be embodied otherwise without departing from such principles.

What is claimed is:

1. A liquid control valve comprising, in combination, a housing, defining a valve chamber with a side wall and a bottom wall; an inflow port communicating with said valve chamber at a lower portion of said side wall; an annular seat provided at said bottom wall defining an outflow port; a float retaining member positioned beneath said outflow port; a float retained within said float retaining member in a freely movable state; a sealing member consisting of a piston disposed within said valve chamber and arranged displaceably in an air-tight sealing engagement along said wall of said valve chamber at its upper portion, thereby forming a pressure chamber; a sealing element mounted on said piston over said annular seat for cooperation therewith; a slender rod projecting from said piston into said float retaining member through said outflow port; a first orifice provided in said sealing member interconnecting said pressure chamber with said outflow port, and a second orifice positioned at the lower end of said slender rod over said float and leading therefrom to said pressure chamber through a passage; said first orifice having a smaller cross-sectional area than said second orifice.

2. A valve according to claim 1, wherein said float cooperates with said second orifice by means of a pilot valve suspended under said second orifice.

3. A valve according to claim 1, including means resiliently biasing said sealing member in the direction of valve closing.

4. A valve according to claim 1, including a plate provided on said sealing member around said slender rod under said outflow port.

5. A valve, according to claim 1, wherein said float retaining member is formed by a bell chamber including a bottom aperture secured to said housing and provided with a screen at said bottom aperture.

6. A valve according to claim 2, including resilient means biasing said sealing member in the direction of valve closing.

7. A valve according to claim 6, including a plate provided on said sealing element around said slender rod under said outflow port.

* * * * *